United States Patent [19]
Toda

[11] Patent Number: 5,742,776
[45] Date of Patent: Apr. 21, 1998

[54] DECISION SUPPORT SYSTEM

[75] Inventor: Mitsuhiko Toda, Kawasaki, Japan

[73] Assignee: Fujitsu Limited, Kawasaki, Japan

[21] Appl. No.: 527,218

[22] Filed: Sep. 12, 1995

[30] Foreign Application Priority Data

Sep. 13, 1994 [JP] Japan ................................ 6-218403

[51] Int. Cl.$^6$ ............................................ G06F 17/60
[52] U.S. Cl. ............................................ 395/201
[58] Field of Search ................................. 395/201, 211, 395/207, 208, 925, 926

[56] References Cited

PUBLICATIONS

"Case–Based Reasoning", Proceedings of a Workshop on Case–Based Reasoning, May 31–Jun. 2, 1989, pp. 1–3.
Ralph Barletta, "An Introduction to Case–Based Reasoning", AI Expert, Aug. 1991, pp. 43–49.

*Primary Examiner*—Donald E. McElheny, Jr.
*Attorney, Agent, or Firm*—Staas & Halsey

[57] ABSTRACT

A decision support system collects and analyzes necessary information about an object on which a decision is to be made, and presents a plurality of alternative items to give support to making a decision. To efficiently and quickly perform the process repeatedly by making similar, not routine decisions, a case decided by an alternative item selecting unit is extracted by a case learning unit and stored by a case accumulating unit. When a decision is to be made on a new object, the accumulated similar past cases are extracted by comparing input object information by an object information comparing unit to give support to selecting an alternative item. Necessary information can be obtained through an interactive guide by a selection speeding up unit and the optimum alternative item is output by the software of the alternative item selecting unit.

13 Claims, 10 Drawing Sheets

| CASE i | CASE 1 (MR. $E_1$) | CASE 2 (MR. $E_2$) | CASE 3 (MR. $E_3$) |
|---|---|---|---|
| OBJECT INFORMATION ($Eq_i$) | OCCUPATION=p1<br>AGE =35<br>HIGHEST DEGREE = BACHELOR<br>MAJOR = ELECTRICAL ENGINEERING<br>WORKING CAREER 1= a1<br>WORKING CAREER 2= a2<br>SPECIALTY = CIRCUIT DESIGNING<br>ANNUAL INCOME = i1YEN<br>COOPERATIVENESS = b1<br>CREATIVITY= b2<br>...<br>MARITAL STATUS=MARRIED<br>CHILDREN= TWO CHILDREN<br>... | OCCUPATION=p2<br>AGE =30<br>HIGHEST DEGREE = MASTER<br>MAJOR=COMPUTER ENGINEERING<br>WORKING CAREER 1= a3<br>SPECIALTY = SYSTEM ENGINEERING<br>ANNUAL INCOME = i2YEN<br>COOPERATIVENESS = b3<br>CREATIVITY= b4<br>...<br>MARITAL STATUS=MARRIED<br>CHILDREN=NO CHILDREN<br>... | OCCUPATION=p3<br>AGE =22<br>HIGHEST DEGREE = BACHELOR<br>MAJOR=PHYSICS<br>.<br>.<br>.<br>COOPERATIVENESS = b5<br>CREATIVITY= b6<br>...<br>MARITAL STATUS=UNMARRIED<br>... |
| OPTIMUM ALTERNATIVE ITEM ($Aq_i$) | NOT HIRED | HIRED | HIRED |
| SERIES OF SOFTWARE ($S_i$) | $S1 \equiv (S1[1],$<br>$S1[2],$<br>$S1[3],$<br>$S1[4])$ | $S2 \equiv (S2[1],$<br>$S2[2],$<br>$S2[3],$<br>$S2[4])$ | $S3 \equiv (S3[1],$<br>$S3[2],$<br>$S3[3],$<br>$S3[4])$ |

| | | | |
|---|---|---|---|
| Epi[1] | OCCUPATION=p1<br>AGE=35<br>HIGHEST DEGREE=BACHELOR<br>MAJOR=ELECTRICAL ENGINEERING<br>... | OCCUPATION=p2<br>AGE=30<br>HIGHEST DEGREE=MASTER<br>MAJOR=COMPUTER ENGINEERING<br>... | OCCUPATION=p3<br>AGE=22<br>HIGHEST DEGREE=BACHELOR<br>MAJOR=PHYSICS<br>... |
| Ui[1] | NONE | NONE | NONE |
| Eqi[2] | COOPERATIVENESS = b1<br>CREATIVITY = b2<br>... | COOPERATIVENESS = b3<br>CREATIVITY = b4<br>... | COOPERATIVENESS = b5<br>CREATIVITY = b6<br>... |
| Ui[2] | NONE | NONE | NONE |
| Eqi[3] | MARITAL STATUS=MARRIED<br>CHILDREN=TWO CHILDREN<br>... | MARITAL STATUS=MARRIED<br>CHILDREN=NO CHILDREN<br>... | MARITAL STATUS=UNMARRIED<br>... |
| Ui[3] | NONE | NONE | NONE |
| Eqi[4] | S1[1] = v1<br>S1[2] = v2<br>S1[3] = v3 | S2[1] = v5<br>S2[2] = v6<br>S2[3] = v7 | S3[1] = v9<br>S3[2] = v10<br>S3[3] = v11 |
| Ui[4] | INTERVIEW EVALUATION = v4 | INTERVIEW EVALUATION = v8 | INTERVIEW EVALUATION = v12 |

|  | ELECTRICAL ENGINEERING | COMMUNICATIONS ENGINEERING | COMPUTER ENGINEERING | COMPUTER SCIENCE | PHYSICS |  |
|---|---|---|---|---|---|---|
| ELECTRICAL ENGINEERING | 1 | 0.8 | 0.7 | 0.5 | 0.3 |  |
| COMMUNICATIONS ENGINEERING | 0.8 | 1 | 0.8 | 0.6 | 0.2 |  |
| COMPUTER ENGINEERING | 0.7 | 0.8 | 1 | 0.9 | 0.1 |  |
| COMPUTER SCIENCE | 0.5 | 0.6 | 0.9 | 1 | 0.2 |  |
| PHYSICS | 0.3 | 0.2 | 0.1 | 0.2 | 1 |  |
| --- | | | | | | --- |

DISPLAY SCREEN 60

IS SIMILAR CASE EXISTING ? : YES
SELECT ATTRIBUTE STRING : $E_2$, $E_1$
INPUT ATTRIBUTE VALUES
OF OBJECT INFORMATION       : MR.$E_x$ ≡ (OCCUPATION = p2,
                                         AGE = 31,
                                         HIGHEST DEGREE = MASTER,
                                         MAJOR = COMPUTER ENGINEERING,
                                         WORKING CAREER = a4,
                                         SPECIALTY = SYSTEM ENGINEERING,
                                         ANNUAL INCOME FOR PREVIOUS CAREER
                                                         = i3 YEN,
                                         COOPERATIVENESS = b7,
                                         CREATIVITY = b8,
                                         MARITAL STATUS = MARRIED,
                                         CHILDREN = NO CHILDREN)

USER INPUT

FIG. 6B

DISPLAY SCREEN 60

MR. $E_2 \equiv$ (OCCUPATION = p2, AGE = 30, HIGHEST DEGREE = MASTER, MAJOR = COMPUTER ENGINEERING, WORKING CAREER 1 = a3, SPECIALTY = SYSTEM ENGINEERING, ANNUAL IMCOME FOR THE PREVIOUS CAREER = i2 YEN, COOPERATIVENESS = b3, CREATIVITY = b4, MARITAL STATUS = MARRIED, CHILDREN = NO CHILDREN) $\sigma = \sigma 2$ MR. $E_1 \equiv$ (OCCUPATION = p1, AGE = 35, HIGHEST DEGREE = BACHELOR, MAJOR = ELECTRICAL ENGINEERING, WORKING CAREER 1 = a1, WORKING CAREER 2 = a2, SPECIALTY = CIRCUIT DESIGNING, ANNUAL IMCOME FOR PREVIOUS CAREER = i1 YEN, COOPERATIVENESS = b1, CREATIVITY = b2, MARITAL STATUS = MARRIED, CHILDREN = 2 CHILDREN) $\sigma = \sigma 1$

SYSTEM OUTPUT

MR. $E_2$ HAS SIMILARITY EQUAL TO OR HIGHER THAN $\sigma o$ ( $\sigma 2 \geq \sigma o$ )

DECISION SUPPORT SYSTEM

BACKGROUND OF THE INVENTION

1. Field of the Invention

The present invention relates to a computer system for giving support to various enterprises, etc. in determining an item to be selected from a number of alternative items by collecting and analyzing information about an object on which a decision is to be made, and more specifically to a decision support system for repeatedly performing similar, not routine decision making processes efficiently and at a high speed.

2. Description of the Related Art

The conventional decision support system (hereinafter referred to as a DSS) selects an alternative item to be selected using one of the following methods.

(1) Method used when a procedure order is fixed:

A procedure to use software for a DSS is fixed and the user only inputs data to the software and a decision is made by referring to output results. When the procedure or the software is activated for decision making in this method, the software, etc. directly requests the user for input information, or reads information required for decision making from a predetermined file, etc., evaluates it, and outputs alternative items in the order of a predetermined evaluation criterion. In this method, the user has only to enter predetermined input object information without detailed knowledge of the procedure or software, hence is not required technical knowledge of the DSS.

(2) Method used when a procedure is not fixed, but is left to the user:

The procedure to use the software provided by the DSS is left to the user. In this method, some sets of software are available depending on the object and situation of decision making. The user selects appropriate software which is to output a result through which the user can make a decision, and enters object information depending on the software. If necessary, plural sets of software can be sequentially activated to use an output result of one set of software as input information to another set of software. In this method, the capabilities of the DSS can be flexibly used for a number of different cases. However, the user is required to have technical knowledge to utilize the DSS.

The above listed method (1) shows the problem that the user can only use the DSS in making a routine decision. The method (2) above allows more freedom but is burdensome to the user, thereby taking a longer time in making a decision and requiring technical knowledge to utilize the DSS.

SUMMARY OF THE INVENTION

The present invention aims at solving the above described problems of the prior art and providing a decision support system capable of effectively and easily using a number of past cases when similar, not routine decision making processes are repeatedly performed.

The decision support system according to the present invention is provided with an alternative item selecting unit for receiving object information about an object on which a decision is to be made, evaluating the input object information through one or more sets of specified software, and outputting the evaluation result or alternative items based on the evaluation result.

The system further comprises a case accumulating unit for accumulating and storing object information about cases for which the decision making processes were performed supported by the alternative item selecting unit, an object information comparing unit for comparing the input object information of a new case with the object information accumulated for each case by the case accumulating unit and for selecting cases similar in object information, and an output unit for outputting an evaluation result of a new object on which a decision is to be made.

The object information comparing unit selects past cases similar to the case to be newly decided from the case accumulating unit for accumulating the cases for which the decision making processes were performed by the alternative item selecting unit.

Thus, the user can substitute a result of the past decision making for an answer to the decision making for a new case, thereby efficiently making a decision for a new case at a high speed.

The decision support system according to the present invention is designed to accumulate in the case accumulating unit the object information for each case followed when the alternative item selecting unit supports a decision making process, and to comprise a selection speeding up unit for interactively guiding the procedure by indicating the procedure of similar cases and outputting the support information to be provided for the alternative item selecting unit.

If an appropriate case exists in the past cases on which the decision making process was performed, input object information can be amended to have the alternative item selecting unit support the decision making process according to the procedure of the decision making process executed in the past.

Therefore, the user can easily obtain a more appropriate result of the decision making process for a case to be newly decided by modifying input object information and inputting it, without technical knowledge of setting a procedure being required in using the DSS.

Other features and merits of the present invention are clearly explained below, with reference to the attached drawings.

BRIEF DESCRIPTION OF THE DRAWINGS

FIGS. 6A through 7B show examples of the interactive display screens of the decision support system according to the present invention.

DESCRIPTION OF THE PREFERRED EMBODIMENT

Figure 1:
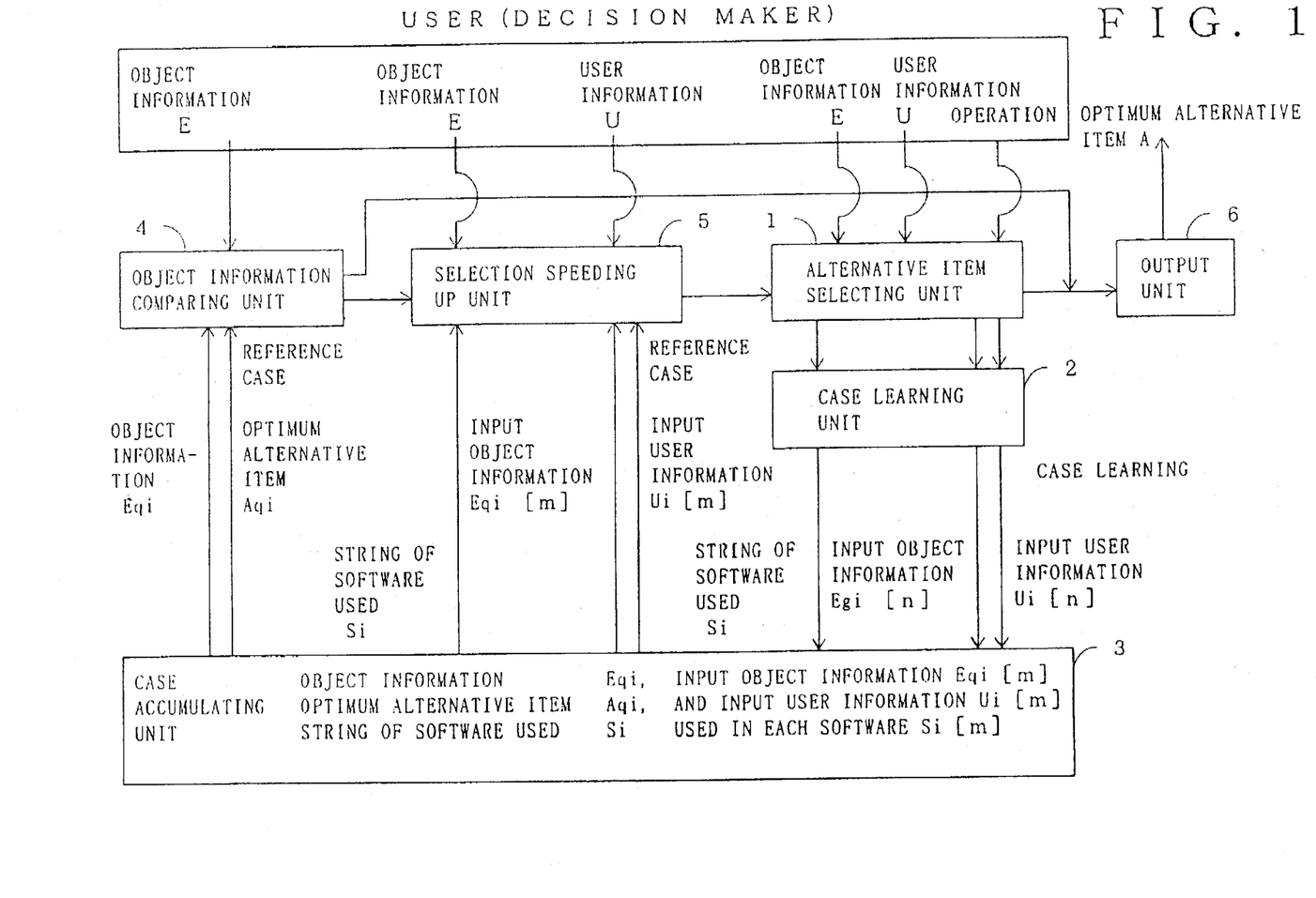
FIG. 1 shows an example of the configuration of the present invention.

FIG. 1 shows an example of the configuration according to the present invention. In FIG. 1, 1 indicates an alternative item selecting unit; 2 indicates a case learning unit; 3 indicates a case accumulating unit; 4 indicates an object information comparing unit; 5 indicates a selection speeding up unit; and 6 indicates an output unit. In this example, the output can be, for example, a display device.

The alternative item selecting unit 1 receives the information about the object on which a decision is to be made (object information E), evaluates the input object information through one or more sets of specified software, and outputs the evaluation result or an alternative item based on the evaluation result through the output unit 6. The object information E refers to information that can be obtained as the information input by the user or other systems. In addition to the input object information, the alternative item selecting unit 1 can also use the input user information U, that is, information determined by user's knowledge which is relevant to the decision situation.

The case learning unit 2 receives a case decided by the alternative item selecting unit 1, and extracts the case information including the input object information and the information about the procedure. If there is user information U, the input user information is received together with the input object information. The procedure received by the case learning unit 2 is the sequence of the software used by the alternative item selecting unit 1. The input object information received by the case learning unit 2 comprises, for example, an attribute string indicating the type of the object information and a sequence of attribute values for each attribute. An attribute string refers to a sequence of attributes featuring an object on which a decision is to be made. An attribute value refers to a value for an attribute of the object. The attribute value is not limited to a numerical value. The sequence of the software and the input object information obtained by the alternative item selecting unit 1 are extracted and converted to be stored by the case accumulating unit, as described below.

The case accumulating unit 3 accumulates and stores the case information extracted by the case learning unit 2 in an external storage device such as a disk device, etc.

The object information comparing unit 4 receives the information about the object to be newly decided, and compares the input object information with the object information accumulated for each case in the case accumulating unit 3, and selects a case whose object information is similar to that of the present case. If a case having a similarity value no less than a predetermined reference value is detected, the evaluation result of the case is output through the output unit 6 as the optimum alternative item A for the decision.

The selection speeding up unit 5 displays the procedure of the similar cases selected by the object information comparing unit 4, interactively guides the order of the processes, further receives, if necessary, the object information E, etc., and outputs instructive information to the alternative item selecting unit 1. In response to the instructive information, the alternative item selecting unit 1 can evaluate the information obtained from the selection speeding up unit 5 by referring to the similar cases, even if the user does not have complete knowledge about the input and procedure required in making a decision, thereby selecting the optimum alternative item.

The user enters data for the alternative item selecting unit 1, selection speeding up unit 5, and object information comparing unit 4 through, for example, a keyboard.

The alternative item selecting unit 1 has capabilities similar to those of the conventional decision support systems, and supports the decision making by presenting evaluation and alternative items. The present invention stores the order of the decision making process performed by the user through the alternative item selecting unit 1 in the case accumulating unit 3 through the case learning unit 2.

When a decision making process is newly performed, the object information comparing unit 4 retrieves a similar past case of decision from the case accumulating unit 3. The selection speeding up unit 5 displays the procedure used in the retrieved case of decision and interactively guides the user to make a decision. Thus, only a new portion in the information for the new case is amended to efficiently reach a decision.

Particularly, the user can easily decide the optimum alternative item by interactively displaying a number of similar cases as references. Furthermore, the user can quickly decide the optimum alternative item by interactively displaying the procedure of a number of similar cases to guide the user on the procedure, and by operating the alternative item selecting unit 1.

The outline of the process according to an embodiment of the present invention is explained by referring to FIG. 1.

(1) Alternative item selecting unit 1

The user of the present system (decision maker) operates the alternative item selecting unit 1 (similar to the conventional decision support system) to enter object information E and user information U and decide the optimum alternative item A. Unless the high-speed process support mechanism of the present invention as described below is used, the user has to input data to the software $S(1), S(2), \ldots$ provided by the alternative item selecting unit 1 (object information E and user information U) and operate the software.

The information processed in this decision support system is as follows.

1. object information E: Information relating to the object on which a decision is to be made. This is obtained by the user's entry or from other systems.

2. user information U: Information obtained from the user's knowledge about the environment of the object on which a decision is to be made. For example, in making a decision on the hiring of employees, the evaluation values the user obtains through the actual interviews with candidates correspond to the user information U.

3. optimum alternative item A: An alternative item or decision making result determined to be the optimum based on the object information E and user information U using the system.

(2) Case learning unit 2

The case learning unit 2 extracts a case decided by the user through the alternative item selecting unit 1 and stores it in the case accumulating unit 3.

The case learning unit 2 converts the data output from the alternative item selecting unit 1. Since the alternative item selecting unit 1 performs a process for selecting an alternative item, the data to be accumulated is processed (rearranged, etc.) in the case learning unit 2. That is, the case learning unit 2 corresponds to units for data accumulating functions of data base management systems. The data conversion is performed because the data formats are mostly different between the alternative item selecting unit 1 and case accumulating unit 3. According to the present embodiment, the process of extracting/converting data performed by the case learning unit 2 is hereinafter referred to as "learning".

That is, the following items 1 and 2 are learned in case i (i refers to an identifier for identifying each of the multiple cases) and stored in the case accumulating unit 3.

1. A string indicating the sequence of the used software (a string of software used)

$Si=(Si[1], Si[2], \ldots)$ (where $Si[n]$ is any of the software $S(1), S(2), \ldots$ for evaluation used by the alternative item selecting unit 1.

Using the identifier i indicates that the process relates to case i. The character enclosed by [ ] is a number identifying software or object information in a case.

2. input object information Eqi[n] and input user information Ui[n] to the software Si[n]

(3) Case accumulating unit 3

The information about the past decision making cases stored in the case accumulating unit 3 is represented as follows.

1. Object information $Eqi \equiv (Eqi(1) = eqi(1), Eqi(2) = eqi(2), \ldots)$ where Eqi(j) indicates the attribute of the specific information of the object, and eqi(j) indicates the attribute value. For example, when an object is a person, "age" is represented as attribute Eqi(j), and "25 years" is represented as attribute value eqi(j). This embodiment represents "age=25 years".

2. Optimum alternative item Aqi

Aqi refers to a decision making result or software process result obtained when the object information Eqi and user information Ui are input.

3. String of software used $Si \equiv (Si[1], Si[2], \ldots)$ where Si indicates the sequence of the software of the alternative item selecting unit 1 used when Aqi is decided.

4. input object information Eqi[m] and input user information Ui[m] used by each of the software Si[m] of Si $Eqi[m] = (Eqi(j) = eqi(j), Eqi(k) = eqi(k), \ldots)$ $Ui[m] = (Ui(1) = ui(1), Ui(2) = ui(2), \ldots)$ where $Eqi(j) = eqi(j), Eqi(k) = eqi(k), \ldots$ applies to object information $Eqi \equiv (Eqi(1) = eqi(1), Eqi(2) = eqi(2), \ldots$ (4) Object information comparing unit 4 and selection speeding up unit 5

The following two methods can be used followed to efficiently make a decision using a quick process support mechanism.

(4-1) When past reference cases having close similarity are accumulated:

When past reference cases having close similarity to input object information E are accumulated, the reference cases are interactively displayed through the object information comparing unit 4. The optimum alternative item A is output according to the user's selection instruction from the displayed Aqi. The similarity refers to the degree of resemblance between the input object information E and the past case, and is described later in detail.

(4-2) When past reference cases having some similarity are accumulated:

When reference cases similar to the input object information E are accumulated, but with lower similarity than in (4-1) above, the selection speeding up unit 5 displays similar cases. That is, the software string Si, input object information Eqi[m], and input user information Ui[m] of the similar cases stored in the case accumulating unit 3 are displayed. If there are differences in information, then the object information E and user information U are obtained, amended according to the data input by the user, and output to the alternative item selecting unit 1. The software of the alternative item selecting unit 1 is activated by the selection speeding up unit 5, and the optimum alternative item A is output based on the result obtained from the instructive information of the selection speeding up unit 5.

Figure 2:
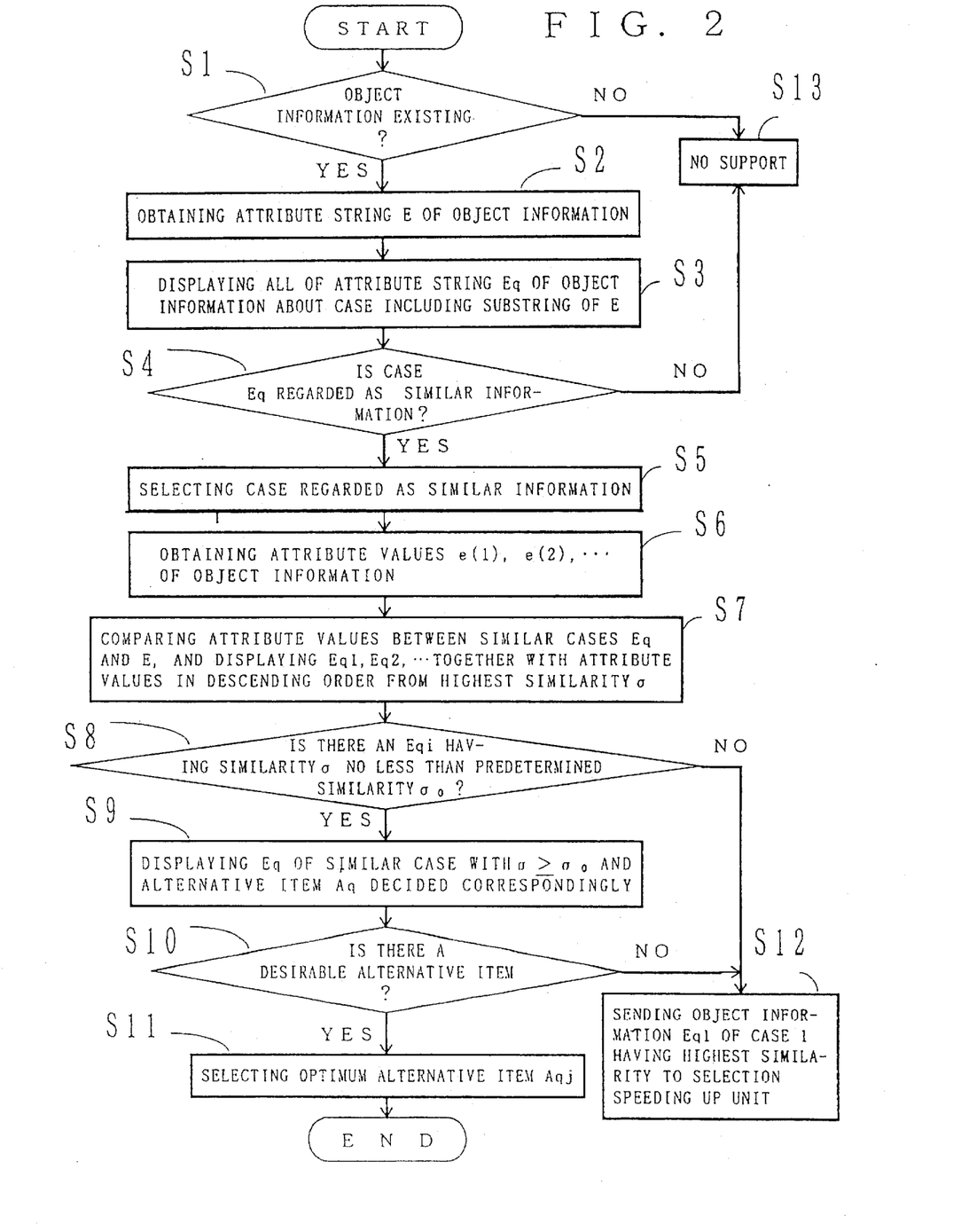
FIG. 2 is a flowchart of the processes of the object information comparing unit according to an embodiment of the present invention.

FIG. 2 shows the procedure in which a decision making process can be performed at a high speed by displaying similar past cases through the object information comparing unit 4. In step S1 shown in FIG. 2, it is determined whether or not the object information is stored in the case accumulating unit 3. That is, it is determined whether or not the case accumulating unit 3 stores past cases. If "yes", the process in step S2 is performed. If "no", no support is provided (step S13) and processes similar to the conventional methods are performed by the user.

In step S2, the attribute string E of the user-input object information is obtained. In this embodiment, the user inputs an attribute string of $E = (E(1), E(2), \ldots)$.

In step S3, the attribute string Eq of the object information in a past case including the substring of the attribute string E, is obtained from the case accumulating unit 3 and all of it is displayed. That is, the case of an object information sharing the same attribute is displayed as a candidate for a similar case.

In step S4, it is determined according to the user's instruction input whether or not case Eq is similar. If "no", control is transferred to step and a process similar to the conventional methods is performed by the user without support from the system.

In step S5, some similar cases are selected from Eq according to the instruction from the user. The selected cases are identified as Eq1, Eq2, ...

In step S6, the attribute value $e(1), e(2), \ldots$ of the object information are obtained according to input from the user. Therefore the attributes and the attribute values input by the user are as follows;

$E = (E(1) = e(1), E(2) = e(2), \ldots)$

In step S7, the attribute value of the similar case Eq are compared with that of the object information E, and the similar cases Eq1, Eq2, ... are arranged in descending order of similarity σ from the highest similarity, and displayed with the attribute values. The similarity σ is calculated based on the weighted distance, etc. A more complicated method is to provide basic data of the similarity based on methods such as the multi-dimensional scaling (MDS), analytic hierarchy process (AHP), etc. and calculate the actual similarity by the software.

For example, $Eq1 \equiv (Eq1(1) = eq1(1), Eq1(2) = eq1(2), \ldots)$ σ=σ1

$Eq2 \equiv (Eq2(1) = eq2(1), Eq2(2) = eq2(2), \ldots)$ σ=σ2 where Eq1, Eq2, ... indicate the object information of the selected cases, and the similarity σ with E is decremented with σ1 (Eq1) as a maximum.

In step S8, it is determined whether or not there exist $E_{qi}$ whose similarity σ is equal to or higher than a predetermined similarity $\sigma_o$ ($\sigma \geq \sigma_o$). If "yes", the process in step S9 is performed. If "no", the process in step S12 is performed.

In step S9, the similar case Eq having the similarity equal to or higher than $\sigma_o$ ($\sigma \geq \sigma_o$) and the alternative item Aq decided correspondingly are displayed. For example, as shown by (Eq1, Aq1), (Eq2, Aq2), ..., the object information and the decided alternative item are displayed in combination.

In step S10, it is determined according to the data input by the user whether or not a desirable alternative item exists. If "yes", the process in step S11 is performed. If "no", the process in step S12 is performed.

In step S11, the optimum alternative item Aqj is selected according to the designation by the user. Thus, the optimum alternative item A=Aqj is obtained.

In step S12, the object information Eq1 of the case indicating the highest similarity or the object information of some similar cases are transmitted to the selection speeding up unit 5. Then, the process of the selection speeding up unit 5 shown in FIG. 3 is started.

Figure 3:
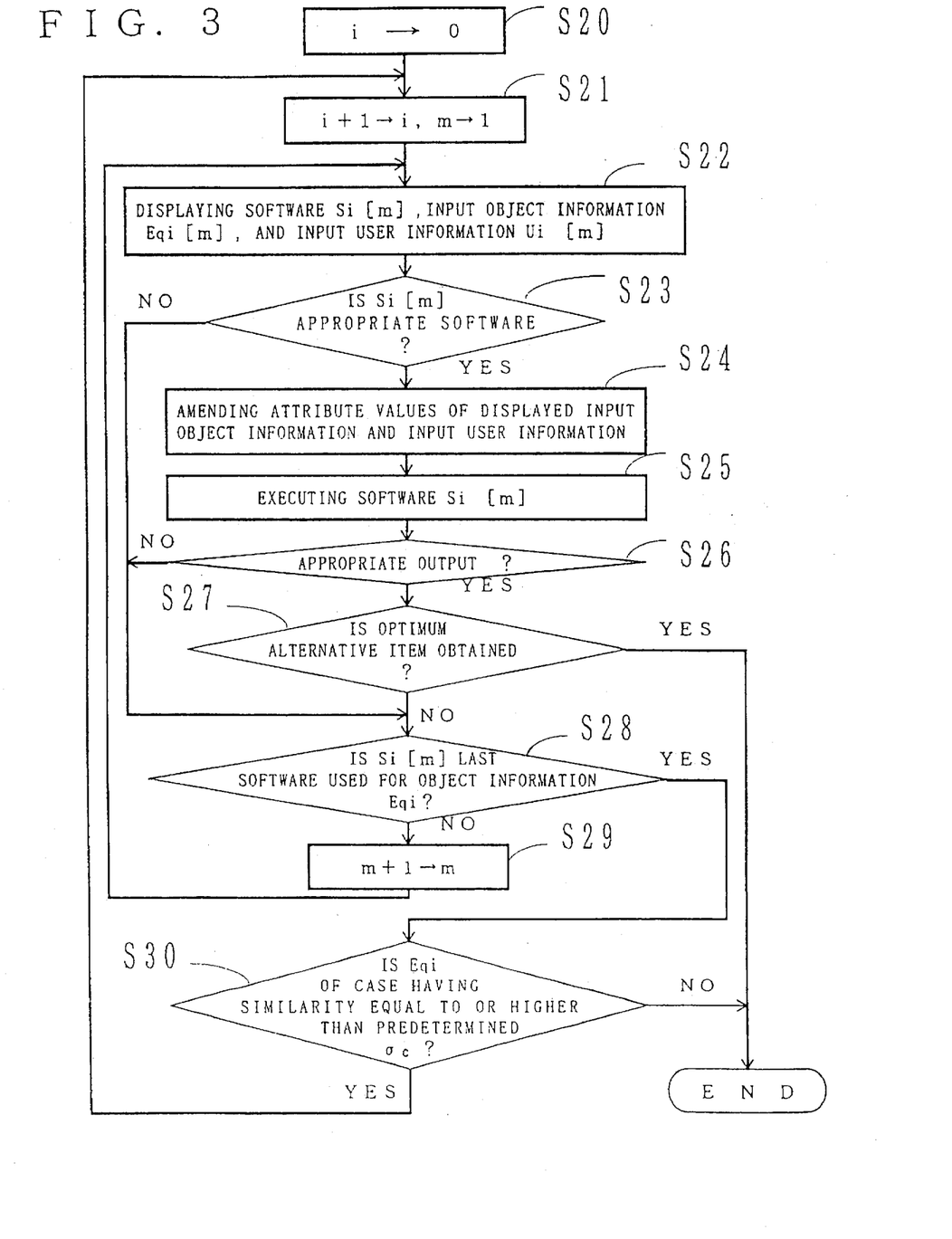
FIG. 3 is a flowchart of the processes of the selection speeding up unit according to an embodiment of the present invention.

FIG. 3 shows the procedure of the selection speeding up unit 5.

The process of the selection speeding up unit 5 is to quickly decide the optimum alternative item for the object information E by displaying step by step the procedure and the software used when the optimum alternative item was selected by the alternative item selecting unit 1 for the object information Eqi together with the input and user information. The software string used for deciding the optimum alternative item for the object information Eqi of similar cases is assumed to be Si≡(Si[1], Si[2], ... ).

In step S20, i is set to 0 as an initial value.

In step S21, the process is started with i+1 set to i and m set to 1.

In step S22, the software Si[m] to be used, input object information Eqi[m], and input user information Ui[m] are displayed.

Input object information Eqi[m]
≡(Eqi(j)=eqi(j), Eqi(k)=eqi(k), ... ),
Input user information Ui [m]
≡(Ui(1)=ui(1), Ui(2)=ui(2) .... )

In step S23, it is determined at the user's instruction whether or not Si[m] is an appropriate software. If "yes", the process in step S24 is performed. If "no", control is passed to step S28.

It is determined in various cases that the software is not appropriate. Some examples are described as follows.

1. When there are plural sets of software which use for evaluation the same input information, and Si[m] used for the case i is not appropriate for the evaluation of the present object E, the user searches the alternative item selecting unit 1 for other software provided.
2. When the input information required for Si[m] is not obtained for the object E, the software is skipped and the process is continued. The information corresponding to the output of Si[m] is supplemented by the user input to make a decision.

In step S24, the attribute values of the displayed input object information and input user information are modified.

In step S25, the software Si[m] is executed. That is, the alternative item selecting unit 1 is operated by the output of the selection speeding up unit 5 to operate the software Si[m].

In step S26, it is determined at the instruction of the user whether or not the output of the software Si[m] is appropriate. If "no", control is passed to step S28. If "yes", the process in step S27 is performed. If Si[m] is the software which outputs an intermediate result during the process, then it is determined whether or not the output is appropriate based on experiences of using the decision support system. Otherwise, the process in step S26 can be skipped and control can be transferred to step S27.

In step S27, it is determined by the instruction of the user whether or not the optimum alternative item has been obtained. If the optimum alternative item has not been obtained, the process in step S28 is performed. If it is obtained, the process terminates because the objective has been attained. Whether or not the optimum alternative item has been obtained depends on the user's subjective determination.

In step S28, it is determined whether or not Si[m] is the last software used for the object information Eqi. If "no", the process in step S29 is performed. If "yes", control is passed to step S30.

In step S29, control is returned to step S22 with m+1 set to m, and the next software Si[m] is processed in the same manner.

In step S30, it is determined whether or not Eqi for the case having a similarity equal to or higher than a predetermined value $\sigma_c$ ($\sigma \geq \sigma_c$) still exists. If "yes", control is returned to the process in step S21 to repeat a similar process on the case having the second largest similarity. If "no", the process terminates after determining that the high-speed process support mechanism of the selection speeding up unit 5 has not supported to obtain the optimum alternative item.

Next a practical process is explained by referring to an example of the decision making on hiring employees.

Figure 4A:
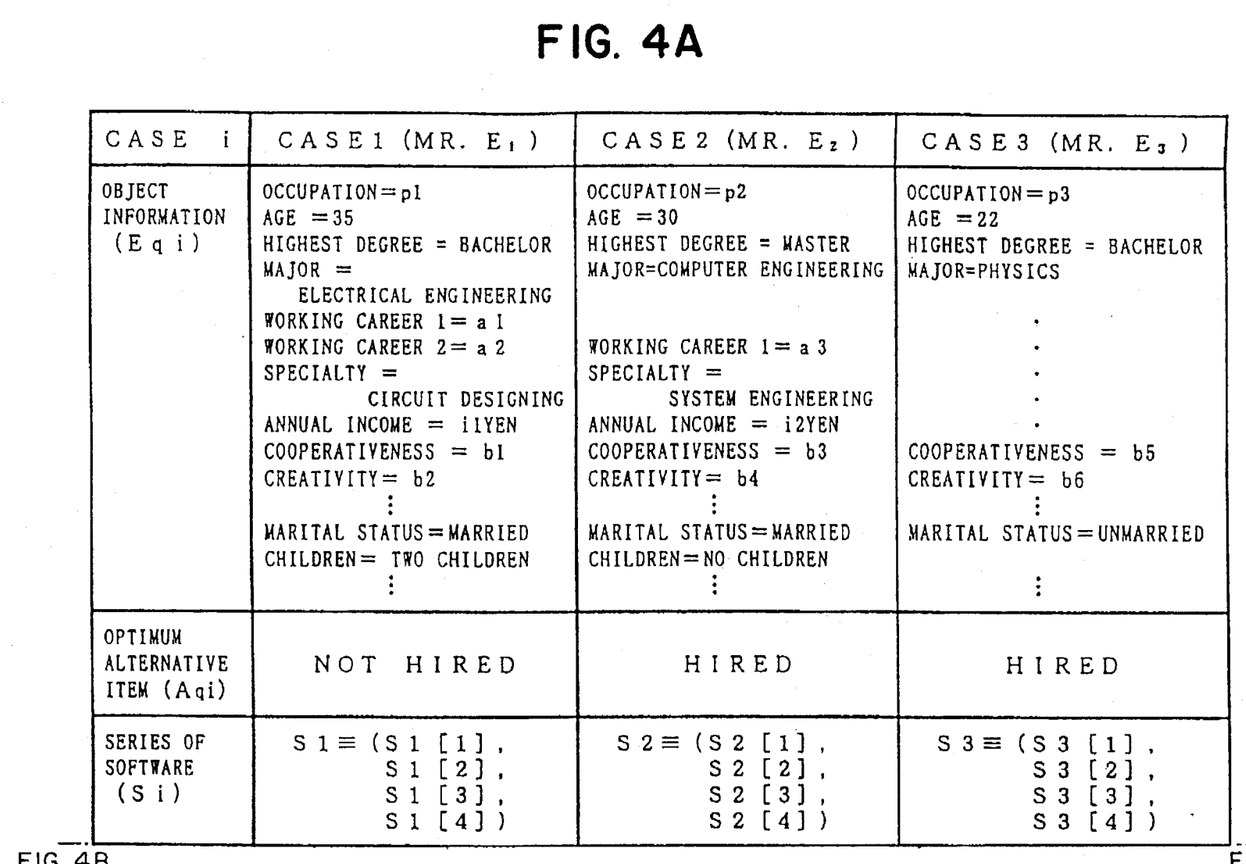
FIG. 4 shows an example of information accumulated in the case accumulating unit according to an embodiment of the present invention.
Figure 4B:
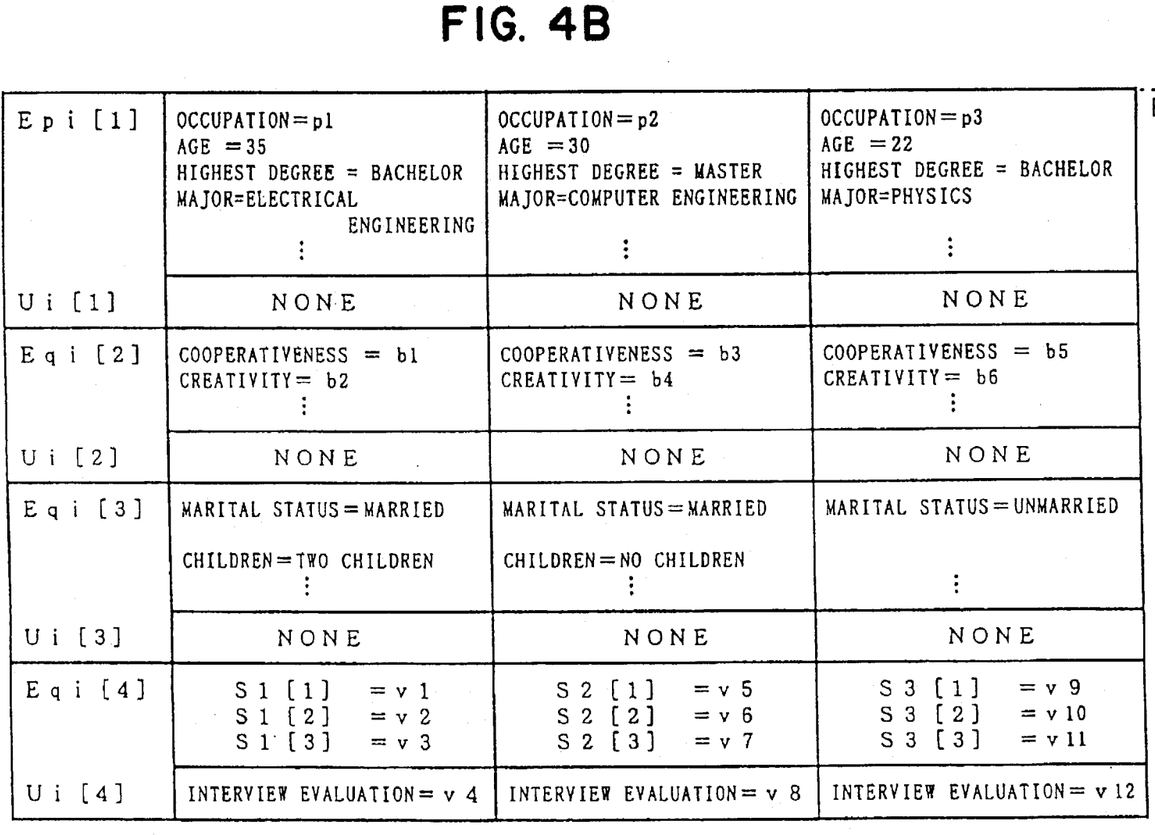

FIG. 4 shows cases of decision making on hiring employees as being stored in the case accumulating unit 3. As shown in FIG. 4, the case accumulating unit 3 stores each object information (Eqi), decided optimum alternative item (Aqi), software string (Si), input object information (Eqi[m]) of each software, and input user information (Ui[m]) for the cases 1 through 3.

The attributes such as occupation type, age, highest degree, major, working career, specialty, annual income for the previous career, etc. and their attribute values are stored as the object information Eqi of the past reference cases. The decision items "to be hired" and "not to be hired" are stored as the optimum alternative item Aqi. The software string (Si) used is the hiring decision software comprising 4 sets of software. Assuming that they are Si[m] (m =1 through 4), Si[1] refers to the specialty evaluating software; Si[2] refers to the personality evaluation software; Si[3] refers to the family evaluation software; and Si[4] refers to the overall decision software.

The input object information Eqi[m] and input user information Ui[m] are stored for each software Si[m] used.

For example, in the specialty evaluating software Si[1], occupation, age, highest degree, major, etc. are set as the input object information Eqi[1]; cooperativeness and creativity, etc. are set as the input object information Eqi[2] of the personality evaluation software Si[2]; and marital status, children, etc. are set as the input object information Eqi[3] of the family evaluation software Si[3]. Furthermore, the evaluation outputs of the specialty evaluating software Si[1], of the personality evaluation software Si[2], and of the family evaluation software Si[3] are set as the input object information Eqi[4] of the overall decision software Si[4]. According to this example, the input user information Ui[m] is set as the interview evaluation (Ui[4]) for the overall decision software Si[4].

An example of the process of deciding on the hiring of the candidates for employment by referring to the accumulated information shown in FIG. 4 is described below. The candidate (Ex) is assumed to have the following information:

Mr. $E_x$ ≡(occupation=p2, age=31, highest degree=master, major=computer engineering, working career=a4, specialty=system engineering, annual income for the previous career=i3 yen, cooperativeness=b7, creativity=b8, ... , marital status=married, children=no children, ... )

The object information comparing unit 4 performs the following processes according to the procedure shown in FIG. 2.

Since the case accumulating unit 3 stores object information (Sl shown in FIG. 2), the data (occupation type, age, highest degree, major, working career, specialty, annual income of the previous career, cooperativeness, creativity, marital status, children, ...) is obtained from the object information comparing unit 4 as an attribute string E of the object information according to the input of the user (S2). At this stage, no attribute values are prompted.

Next, all attribute strings Eq of the object information for the case including the substring of E, that is, Eq1, Eq2, and Eq3 are displayed. That is, the cases of the object information having common attributes with the case of Mr. $E_x$ are displayed as the candidates for similar cases (S3).

The user considers that similar cases exist (S4) and selects cases Eq1 and Eq2 (S5).

The attribute values e(1), e(2), ... of the object information are obtained according to the input of the user (S6). In this example, the attributes of the above described (occupation=p2, age=31, latest educational career=master, major=computer engineering, working career 1=a4, specialty=system engineering, annual income for the previous career=i3 yen, cooperativeness=b7, creativity b8, ..., marital status=married, children=no children, ...) are entered in an interactive operation.

Next, the attribute values are compared between the selected similar cases Eq and E. In the descending of similarity$\sigma$, Eq1 ($\sigma=\sigma1$) and Eq2 ($\sigma=\sigma2$) are displayed with their attribute values (S7). If the similarity of the case of Mr. $E_2$ is the highest, the following information is displayed.

Mr. $E_2$≡(occupation=p2, age=30, highest degree=master, major=computer engineering, working career 1=a3, specialty=system engineering, annual income for the previous career=i2 yen, cooperativeness=b3, creativity=b4, ..., marital status=married, children=no children, ...) $\sigma=\sigma1$ Mr. $E_1$≡(occupation=p1, age=35, highest degree= bachelor, major=electrical engineering, working career 1=a1, working career 2=a2, specialty=circuit designing, annual income for the previous career=i1 yen, cooperativeness=b1, creativity=b2, ..., marital status=married, children=2 children, ...) $\sigma=\sigma2$ Then, it is determined whether or not there is Eqi having the similarity $\sigma$ equal to or higher than a predetermined similarity $\sigma_o$ (S8). If the similarities $\sigma1$ and $\sigma2$ are equal to or higher than the predetermined similarity $\sigma_o$, then the decided alternative item Aq (Aq2=hired, Aq1=not hired) is displayed corresponding to the similar cases of Messrs E2 and E1 (S9). The user is asked whether or not there is a desirable alternative item (S10), and the alternative item selected by the user is decided as the optimum alternative item Aqi. If no desirable reference cases are found, the object information Eq2 for the case of Mr. E2 having the highest similarity is transmitted to the selection speeding up unit 5 (S12). If the similarities $\sigma1$ and $\sigma2$ are lower than the predetermined similarity $\sigma_o$, the object information Eq2 of the case of Mr. E2 having the highest similarity G is transmitted to the selection speeding up unit 5 (S12).

The similarities $\sigma1$ and $\sigma2$ can be calculated based on the weighted distance, etc. as described above. The calculation is very difficult for such attributes as major, working career, etc. Therefore, a similarity table is generated and stored to indicate the similarity of each attribute so that the software can calculate similarity of the cases.

Figure 5:
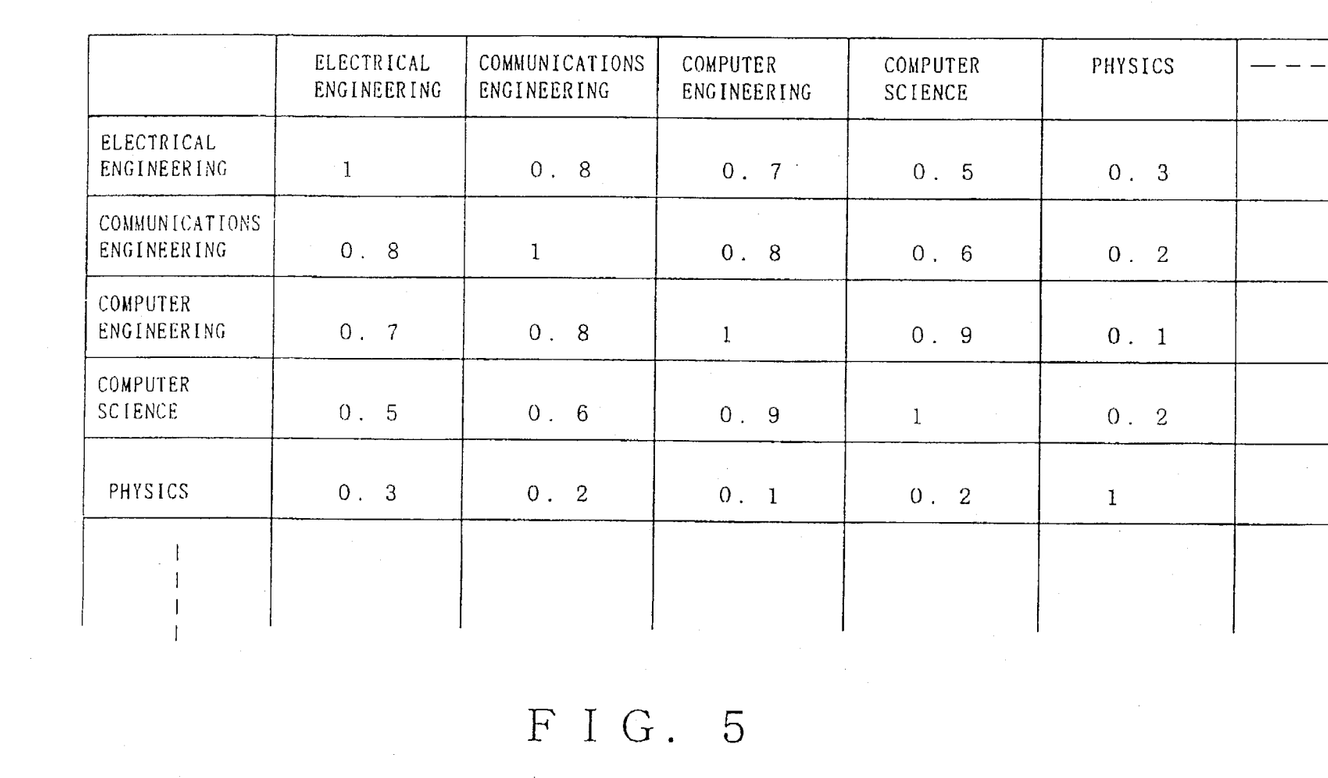
FIG. 5 shows an example of a similarity table whose attribute is "major"

FIG. 5 shows an example of the similarity table whose attribute is "major".

Where the majors match each other in FIG. 5, the similarity is set to 1. That is, "electrical engineering" indicates the highest similarity 1 with "electrical engineering". Likewise, "communication engineering" indicates the highest similarity 1 with "communication engineering". The relation to other majors represented by a lower value indicates lower similarity. These values are set by system designers, software designers, or users depending on the contents of the major. If an attribute value not registered in the stored similarity table is input, the corresponding table is updated.

The selection speeding up unit 5 performs the following process according to the procedure shown in FIG. 3.

The software used in deciding the hiring of Mr. $E_2$ transmitted by the object information comparing unit 4 is S2≡(S2[1], S2[2], S2[3], S2[4]). Since the software S2[1] through S2[3] repeat a similar process, the descriptions of the processes of software S2[1] and S2[3] are omitted. However, the processes of software S2[2] and S2[4] are described below in detail.

First, the software S2[2] of the similar case Eq2, input object information Eq2[2], and input user information U2[2] are displayed (S22).

In the software S2[2] (personality evaluation software), the input object information Eq2[2]≡(cooperativeness=b3, creativity=b4, ...), and no input user information U2[2] exists.

If the software S2[2] is determined to be an appropriate software (S23), the attribute values of the displayed input object information and user information are amended by the input from the user (S24).

The input of the software S2[2] is amended into the input object information E[2]≡(cooperativeness =by, creativity= b8, ...).

Then, the alternative item selecting unit 1 executes the software S2[2] (S25). Since the software S2[2] is not the last software, the optimum alternative item cannot be obtained from it and a similar process is repeated for the next software S2[3] (family evaluation software) with m set to 3 (S22 through S27).

After executing the software S2[3], m is set to 4 (S29) and the software S2[4] (overall decision software) is executed. In step S22 with m=4, the input object information E[4]≡ (evaluation output of S2[1]=v5, evaluation output of S2[2]= v6, evaluation output of S2[3]=v7) and the input user information U[4]≡(interview evaluation=v8) are displayed.

In step S24, the input object information Eq2[4] is changed into Eq2[4]≡(evaluation output of S2[1]=v13, evaluation output of S2[2]=v14, evaluation output of S2[3]= v15) according to the evaluation outputs v13, v14, and v15 obtained as the execution result of the newly executed software S2[1], S2[2], and S2[3]. Then, the input user information U2[4] is changed from v8 into v16 determined as an actual interview result. Thus, U2[4]≡(interview evaluation =v16).

Thus, executing the software S2[4] by amending only the necessary input object information and input user information quickly provides an optimum alternative item. The user only has to first enter the attribute string of the object information. Then, the user follows the guide information based on similar cases. If necessary, attribute values should be amended to obtain the optimum alternative item without precise knowledge on the sequence of software used.

FIGS. 6A through 7B show examples of the interactive displays of the decision support system according to the present invention, displayed, for example, on a display screen 60.

Based on the case of decision making for hiring employees in FIG. 4, these figures show an example when the data of Mr. $E_2$ is used as the supporting results in making a decision on Mr. $E_x$. In this example, some attributes of $E_x$ may not be included in $E_2$. If the attributes not included in $E_2$ among $E_x$ are to be evaluated, and if the attributes can be processed as input by software S(1), S(2) ... provided in the alternative item selecting unit 1, then the software can be used to evaluate the attributes.

Figure 6A:
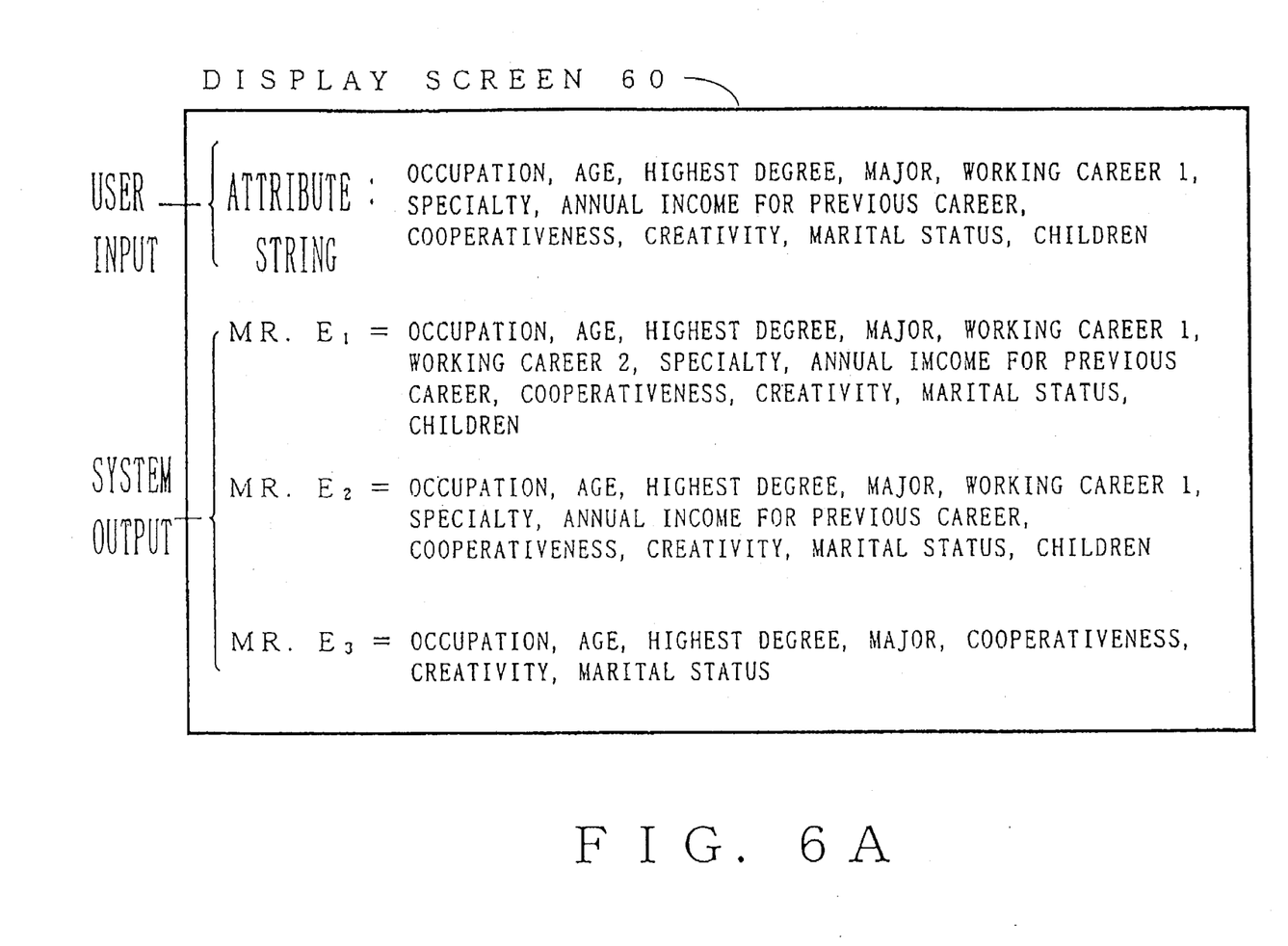

In FIG. 6A, the user enters an attribute string for the object information about Mr. $E_x$ to be decided in hiring. FIG. 6A shows an attribute string as a user input.

When an attribute string of object information is entered, the system displays the attribute string of the object information of the cases including the substring of $E_x$ as shown in step S3 in FIG. 2. FIG. 6A also shows attribute strings as a system output. The attribute string of Mr. $E_1$ contains the working career 2 in addition to the user input attribute string. The attribute string of Mr. $E_2$ matches the user input attribute string. The attribute string of Mr. $E_3$ lacks the working career 1, specialty and annual income for the previous career.

Figure 6B:
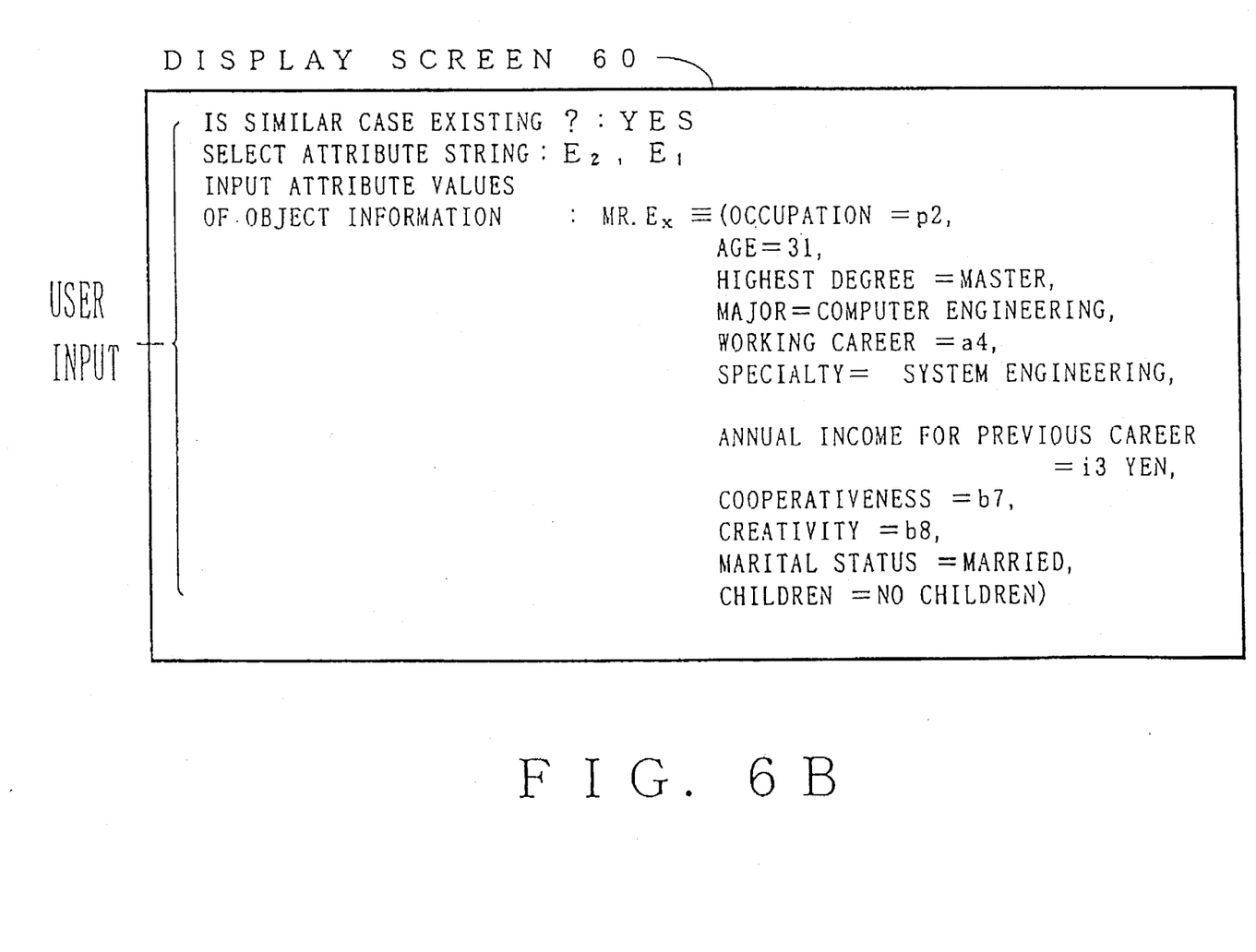

As shown in FIG. 6B, the user enters his or her determination result as to whether or not similar cases exist in the system output shown in FIG. 6A, and also enters the similar cases if existing. The user further enters attribute values for Mr. $E_x$ to be decided in the personnel hiring program.

When the system receives the contents shown in FIG. 6B, the system compares the attributes of the selected persons $E_1$ and $E_2$ with those of Mr. $E_x$ and calculates the similarity $\sigma$. As described above, the similarity can be obtained using the weighted distance, similarity table, etc.

When the similarity $\sigma$ is obtained, the attributes and attribute values of Messrs. $E_1$ and $E_2$ are displayed in the descending order from the highest similarity $\sigma$. It is also determined whether or not there is any similarity higher than a predetermined value $\sigma_o$. If such values exist, they are displayed.

Figure 7A:
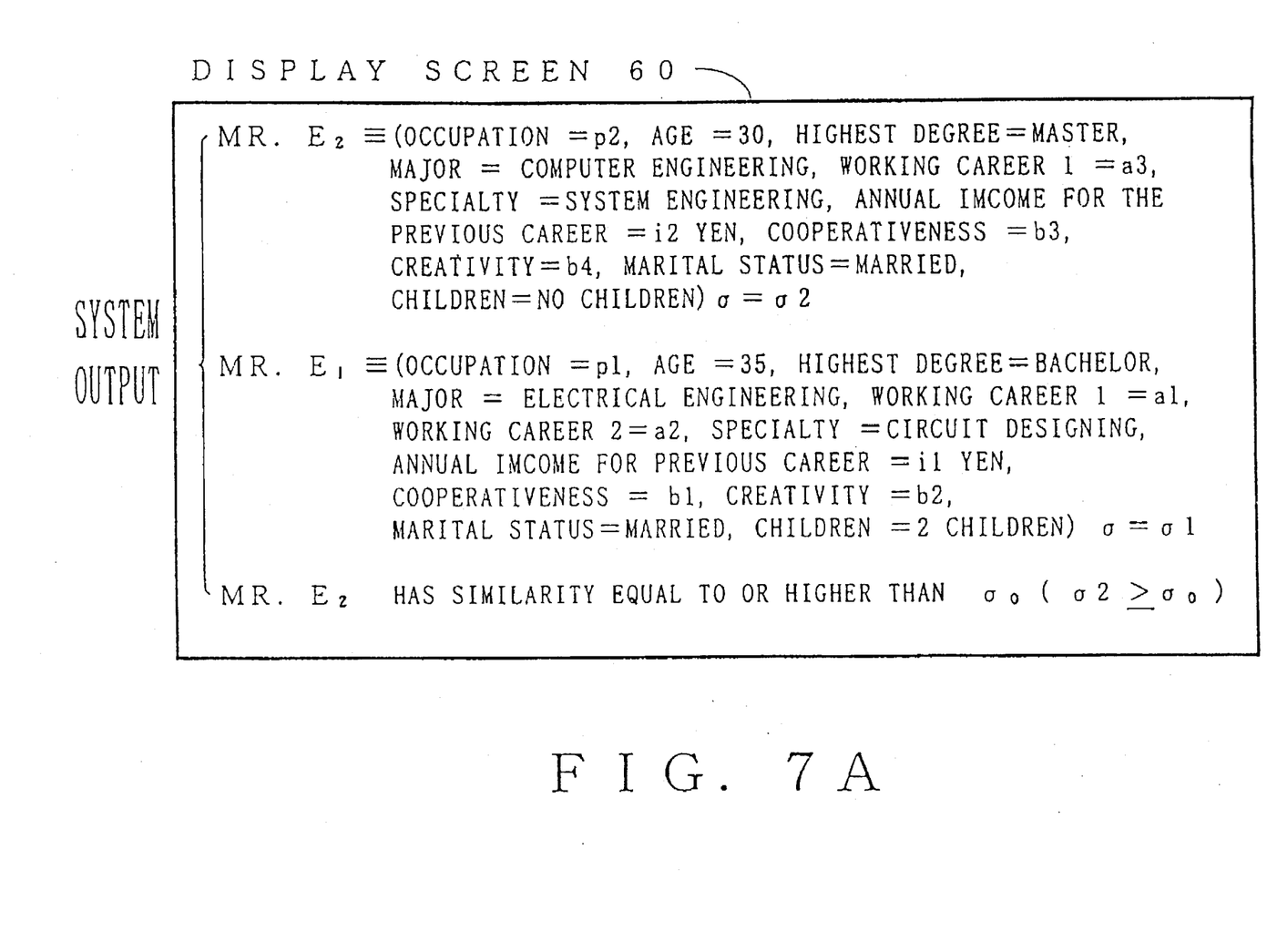

FIG. 7A shows the display of these values. In FIG. 7A, the similarity $\sigma_2$ of Mr. $E_2$ is higher than the similarity $\sigma_1$ of Mr. $E_1$. That is, the attribute string and attribute values of Mr. $E_2$ are displayed first. Since the similarity $\sigma_2$ of Mr. E2 is higher than the predetermined similarity $\sigma_o$ in FIG. 7A, it is also displayed.

The system outputs an alternative item for the case of Mr. $E_2$ because the similarity $\sigma_2$ of Mr. $E_2$ is higher than the predetermined similarity $\sigma_o$.

Figure 7B:
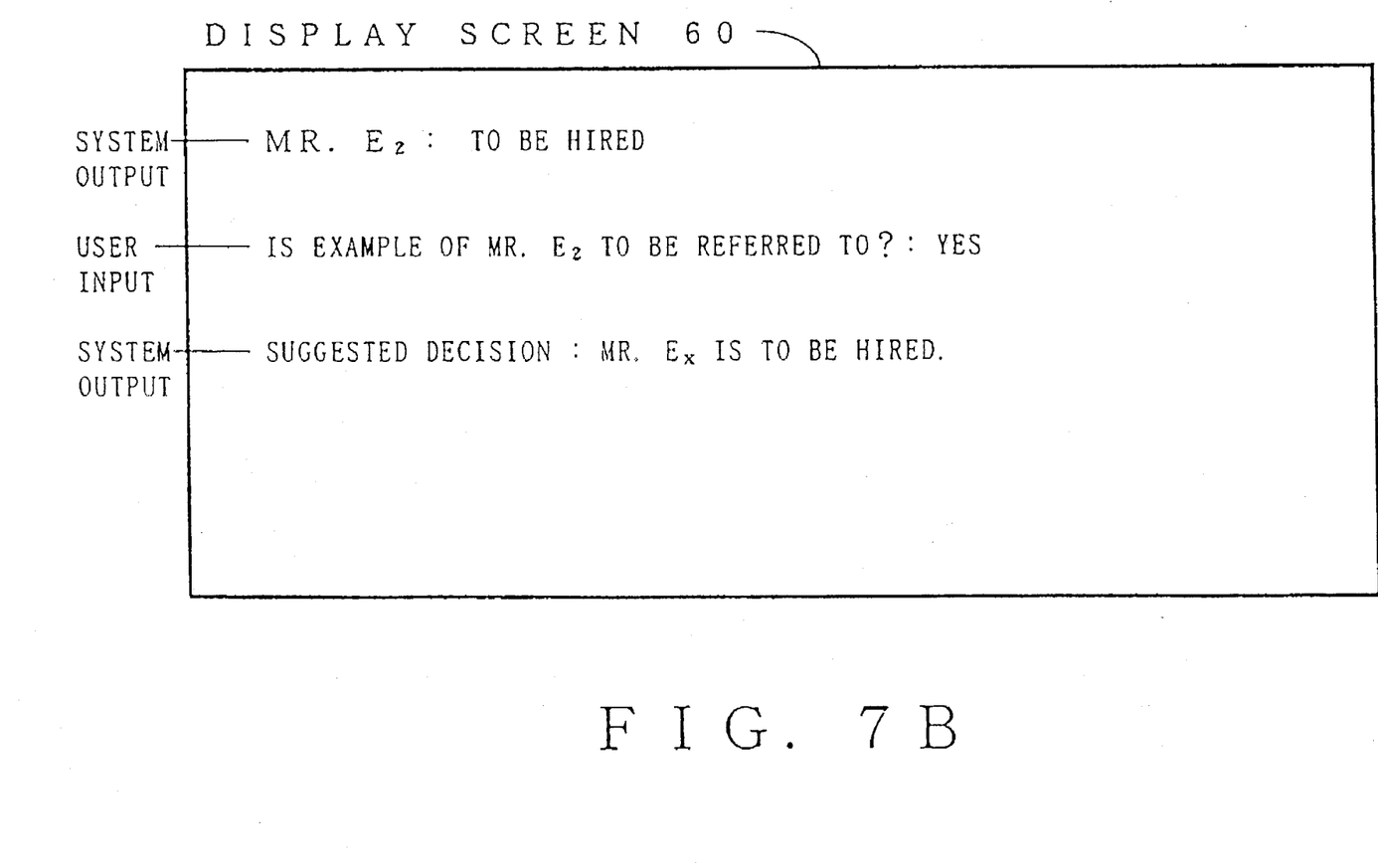

FIG. 7B shows the alternative item for Mr. $E_2$, indicating "Mr. $E_2$, to be hired".

The system prompts the user for the determination result as to whether or not the case of Mr. $E_2$ is to be accepted as an alternative item. In FIG. 7B, the user enters "yes" to adopt the case of Mr. $E_2$ as an alternative item. Thus, entering "yes" by the user accepts the alternative item of the case of Mr. $E_2$, thereby displaying the result that Mr. $E_x$ is to be hired as the suggested decision.

The examples of making decisions in a personnel hiring program has been described above. However, decision making is not limited to personnel hiring, but is applicable for personnel evaluation such as promotion, wage evaluation, etc., for the investment evaluation on equipment, real estate, businesses, etc., and for other evaluations on personal loans and corporate finances. Thus, the present invention can be utilized widely in many fields for making a decision efficiently and quickly.

As described above, a plurality of alternative items are evaluated using a number of evaluation items to obtain the optimum alternative item without excess work load on the user, thereby efficiently making a decision quickly and flexibly corresponding to new conditions.

Particularly, when a reference case having a high similarity is stored, the optimum alternative item can be immediately selected from the evaluation result. Even if the reference case indicates not a high similarity, a necessary software string can be sequentially executed according to the guide based on similar past cases. Accordingly, the user can easily use the present invention even if he or she is not familiar with the software being used or even if the user has forgotten how to operate this decision support system.

Having described a specific embodiment of our bearing, it is believed obvious that modification and variation of our invention is possible in light of the above teachings.

What is claimed is:

1. A decision support system for providing support in making a decision according to information about an object on which the decision is to be made, comprising:

alternative item selecting means for receiving object information about the object on which the decision is to be made, evaluating input object information by at least one set of specified software, and outputting an evaluation result or an alternative item based on the evaluation result;

case accumulating means for accumulating and storing the object information for each case on which the decision was made by said alternative item selecting means;

object information comparing means for receiving input information about a new object on which a decision is to be made, comparing the input information with the object information about each case accumulated in said case accumulating means, and selecting a case whose object information is similar to that of the new object; and output means for outputting the evaluation result of a similar case as the evaluation result of the new object on which the decision is to be made.

2. The decision support system according to claim 1 further comprising:

selection speeding up means for displaying an order of processing of a similar case, interactively guiding a user to the order, and outputting instructive information to said alternative item selecting means, wherein said case accumulating means accumulates the order of processing the object information of each case when said alternative item selecting means provides result to make a decision.

3. The decision support system according to claim 2 further comprising:

case learning means for extracting case information including the object information about the case on which a decision is made by said alternative item selecting means and information about a procedure, and for having said case accumulating means store the case information.

4. The decision support system according to claim 1, wherein said alternative item selecting means makes an evaluation according to the input object information and input user information as a result of the user's determination; and said case learning means extracts the input user information as well as the input object information.

5. The decision support system according to claim 3, wherein said procedure extracted by said case learning means refers to a sequence of the software used by said alternative item selecting means.

6. The decision support system according to claim 3, wherein the input object information extracted by said case learning means refers to an attribute string indicating a type of the object information and a series of attribute values for each attribute.

7. The decision support system according to claim 1, wherein said object information comparing means compares, using a similarity table preliminarily storing a similarity level between items in object information, the input object information with object information accumulated in said case accumulating means.

8. The decision support system according to claim 1, wherein said object information comparing means compares the input object information with the object information accumulated in said case accumulating means by calculating a weighted distance for an item in the object information.

9. The decision support system according to claim 1, wherein said object information comparing means compares using a multi-dimensional scaling (MDS) the input object information with the object information accumulated in said case accumulating means.

10. The decision making support system according to claim 1, wherein said object information comparing means compares using analytic hierarchy process (AHP) the input object information with the object information accumulated in said case accumulating means.

11. A decision support method for providing support in making a decision according to information about an object on which the decision is to be made, comprising the steps of:

(a) receiving object information about the object on which the decision is to be made;

(b) evaluating input object information by at least one set of specified software;

(c) outputting an evaluation result or an alternative item based on the evaluation result;

(d) accumulating and storing the object information for each case on which the decision was made;

(e) receiving input information about a new object on which a decision is to be made;

(f) comparing the input information with the object information about each case accumulated in the step (d);

(g) selecting a case whose object information is similar to that of the new object; and (h) outputting the evaluation result of a similar case as the evaluation result of the new object on which the decision is to be made.

12. The decision support method according to claim 11, further comprising the steps of;

(i) accumulating an order of processing the object information of each case when result to make a decision is obtained in the step (c);

(j) displaying the order of processing of a similar case;

(k) interactively guiding a user to the order; and (l) outputting instructive information to the user.

13. The decision support method according to claim 12, further comprising the steps of;

(m) extracting case information including the object information about the case on which a decision is made and information about a procedure; and (n) storing the case information.

* * * * *